United States Patent [19]
Trudeau

[11] Patent Number: 5,400,376
[45] Date of Patent: Mar. 21, 1995

[54] ULTRASONIC FUEL GAUGING SYSTEM USING STATE MACHINE CONTROL

[75] Inventor: Christian L. Trudeau, Village Glen, Vt.

[73] Assignee: Simmonds Precision Products, Inc., Akron, Ohio

[21] Appl. No.: 42,291

[22] Filed: Apr. 2, 1993

[51] Int. Cl.6 .............................................. G01F 23/28
[52] U.S. Cl. ................................ 377/21; 73/290 V; 73/290 B; 377/2; 340/621
[58] Field of Search .................. 377/21, 2; 73/290 B, 73/290 V, 290 R; 307/465.1; 365/201; 340/621

[56] References Cited
U.S. PATENT DOCUMENTS 3,110,890 11/1963 Westcott et al. ................ 340/621
4,038,648 7/1977 Chesley ........................... 365/201
4,400,976 8/1983 Blades ............................... 73/290
4,470,299 9/1984 Soltz ............................. 73/290 V
4,535,627 8/1985 Prost et al. ..................... 73/290 B
4,596,144 6/1986 Panton et al. ..................... 73/620
4,733,562 3/1988 Saugeon ............................. 73/626
4,815,323 3/1989 Ellinger et al. ................... 73/290
4,853,694 8/1989 Tomecek ........................... 340/621
4,908,783 3/1990 Maier ............................. 73/290 R
4,918,619 4/1990 Orloff et al. ..................... 364/509
4,992,998 2/1991 Woodward ......................... 367/99
5,132,571 7/1992 McCollum et al. ............. 307/465.1

Primary Examiner—John S. Heyman
Attorney, Agent, or Firm—Leonard L. Lewis; William E. Zitelli

[57] ABSTRACT

Ultrasonic fuel gauging apparatus for a fuel tank having a plurality of ultrasonic fuel level sensors for sensing fuel levels at respective predetermined locations in a tank based on echo ranging; a memory means for storing sensor data; and a state device for interrogating each of the sensors by controlling the application of transmit pulses to each of the sensors and for receiving output signals corresponding to return echoes, the state device operating in response to a sequential state counter.

10 Claims, 3 Drawing Sheets

ULTRASONIC FUEL GAUGING SYSTEM USING STATE MACHINE CONTROL

BACKGROUND OF THE INVENTION

The invention relates generally to fuel gauging systems for fuel tanks. More specifically, the invention relates to fuel gauging systems that use ultrasonic level sensors particularly suited for fuel tanks on aircraft.

Ultrasonic fuel level sensors for detecting surface levels of fuel in a tank are well known. These sensors operate using echo ranging in which an ultrasonic pulse on the order of 1 megahertz is emitted towards the liquid surface. The ultrasonic pulse is reflected at the fuel/air interface and returns towards the sensor in the form of an echo pulse. This echo pulse is then detected by the same or a different sensor. The detection sensor typically produces an output signal that corresponds to receipt of the echo. Thus, the round trip time from pulse emission to echo detection corresponds to the distance of the liquid surface from the sensors.

Aircraft fuel gauging systems usually require a large number of such fuel sensors in each tank based on the tank size, location, configuration, degree of accuracy required and possibly for safety redundancy. It is not unusual for a fuel tank to contain 10 or 20 such sensors. Not surprisingly, as the number of ultrasonic sensors increases, so does the complexity of control mechanisms used to interrogate the sensors. Therefore, ultrasonic fuel gauging apparatus commonly have depended on the use of microprocessor controllers and their attendant overhead software programming. However, such dedicated microprocessor based systems can either be expensive to design and maintain, or require complicated interface circuitry to a more powerful system controller. Software errors can also either lower reliability or become costly to locate and remove as system complexity and size increases.

There is a need, therefore, for a lower cost, simpler design for an ultrasonic fuel gauging system that can control a multisensor system without the need for a microprocessor and its attendant software.

SUMMARY OF THE INVENTION

In response to this need, the present invention contemplates an ultrasonic fuel gauging apparatus and methods embodied in the use of such apparatus for a fuel tank, wherein the ultrasonic fuel gauging apparatus comprises a plurality of ultrasonic fuel level sensor means for sensing fuel levels at respective predetermined locations in a tank based on echo ranging; memory means for storing control parameters and sensor data; and a state device for interrogating each of the sensors by controlling the application of transmit pulses to each of the sensors and for receiving output signals corresponding to return echoes, the state device operating in response to a sequential state counter.

DETAILED DESCRIPTION OF THE INVENTION AND PREFERRED EMBODIMENT

Figure 1:
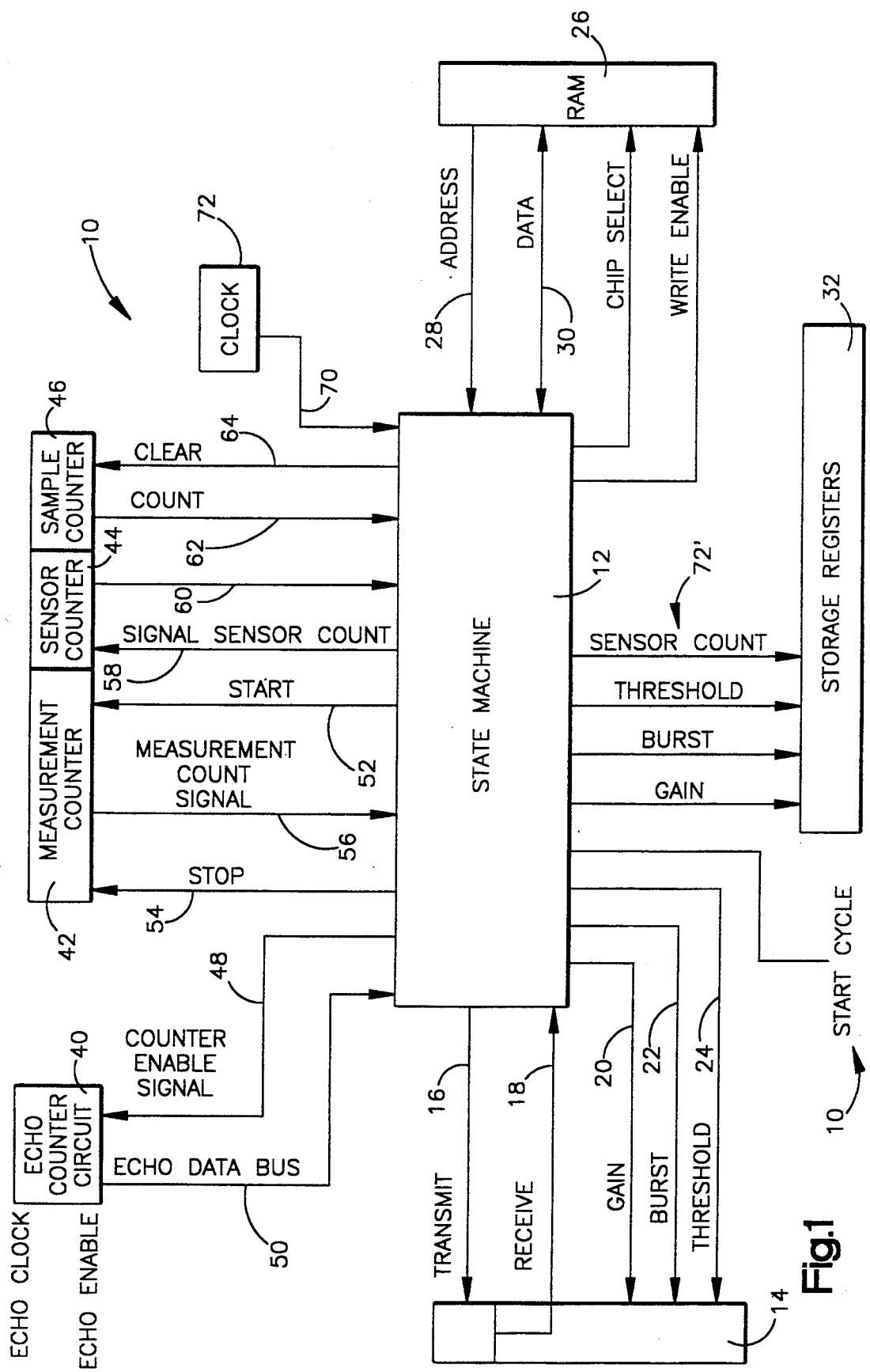
FIG. 1 is a system functional block diagram of a preferred fuel gauging apparatus according to the present invention.

With reference to FIG. 1, a preferred fuel gauging apparatus according to the present invention is generally designated with the numeral 10. This apparatus is particularly well suited for fuel gauging systems used for fuel level detection and gauging in aircraft fuel tanks. An important feature of this embodiment is the use of a state device 12, which I refer to herein as a state device or state machine. The state machine 12 in the preferred embodiment is constructed using a configurable logic device such as part number EPM 7256WM available from ALTERA. However, the term "configurable" with respect to the device 12, is not a reference to software configurable, and in fact an important aspect and advantage of my invention is that the apparatus 10 operates without the use of overhead software commonly associated with microprocessor controllers. Rather, by "configurable" herein I mean that the state device as provided by the manufacturer as simply an array of logic gates and circuits that are not configured to perform a particular dedicated function. Instead, the functions and interconnections of the electronic gates and circuits in the configurable logic device are user defined, so that their operation is that of a state machine which can be sequentially controlled by a simple clock counter. The hardware components are configured as needed to form a state machine to operate simply in response to a clock. Thus, the device 12 operates in the nature of a state machine, in which one or more functions are executed depending on the state count of the device 12. For example, a state machine model can be represented by a finite set of states and state transitions which take place by occurrence of events, e.g., in the form of input signals and prescribed conditions. In a finite state machine model, when a state transition takes place by occurrence of an event, a particular action or operation in response to an input signal takes place. Furthermore, the state device 12 can be reconfigured as needed. In any event, the fuel gauging apparatus 10 is fully operational without attendant software or firmware, such as firmware stored in a ROM.

The state machine 12 as shown in FIG. 1 is connected to a plurality of ultrasonic fuel sensors, represented schematically as block 14, which would be physically located in a fuel tank. In FIG. 1 the sensors 14 are simply represented by a functional block because the sensors are all accessible to the fuel gauging apparatus 10 by appropriate wire connections. The sensors 14, of course, are distributed throughout the fuel tank in a predetermined manner so as to maximize the accuracy of the fuel measurement, as is well known in the art. In the embodiment of FIG. 1, there are provided twenty-four (24) sensors. The state machine 12 accesses each sensor through a multiplexed transmit bus 16 and a multiplexed echo receive bus 18. The state machine 12 also controls gain, burst duration and echo threshold signals 20, 22 and 24 respectively for each sensor.

The state machine 12 is further connected to a random access memory (RAM) device 26 that is used by the state machine 12 during data acquisition to store echo data for each of the sensors 14. The state machine 12 can address the RAM via an address bus 28, and uses signal DATA bus 30 to send and receive data from the RAM 26.

The state machine 12 is also connected to one or more storage registers 32, which are used as a memory to store control parameters such as the echo burst duration, gain values for setting acoustic pulse transmit energy, and threshold values used to detect valid echo returns. Other control parameters can of course be stored in the registers 32, such registers preferably being nonvolatile.

Furthermore, the state machine 12 is operatively connected to a series of counters including an echo counter circuit 40, an measurement counter 42, a sensor counter 44 and a sample counter 46. The echo counter circuit 40 is enabled by the state machine 12 via an ENABLE signal on line 48 and sends echo data to the state machine on data bus 50 in the form of a count which represents the time elapsed between an ultrasonic pulse being transmitted from a particular sensor and the resultant echo being received. The configuration of the state machine 12 controls which sensor 14 echo returns are received from and in which order by sequencing of the multiplexed echo receive bus 18 one sensor at a time. The order in which the sensors are processed is predetermined and designed in as part of the state machine 12 configuration. For example, the order may start with a sensor nominally identified number one being interrogated and sequentially interrogating the remaining sensors through to a sensor nominally identified number twenty-four.

The measurement counter 42 is used by the state machine 12 to identify the maximum time window during which a valid echo can be detected. The state machine 12 uses START and STOP control signals on lines 52,54 to control the measurement counter 42. The count values are returned to the state machine 12 via a MEASUREMENT COUNT signal on bus 56. The count value of the measurement counter 42 represents the elapsed time following emission of an ultrasonic pulse from the sensor 14 presently being interrogated.

The sensor counter 44 is used to identify which sensor 14 is to be interrogated at any given time of operation, e.g., the sensor counter 44 will have a value from 1 to 24 corresponding to the nominal value associated with the respective sensor 14. After all sensors have been interrogated, the state machine 12 issues a CLEAR counter command on line 58 to reset the sensor counter 44. The sensor count data representing the active or presently interrogated sensor 14 is sent from the counter 44 to the state machine 12 via a SENSOR COUNT signal on bus 60.

The sample counter 46 is used to keep track of how many interrogation passes have been made to each sensor 14, since multiple attempts to receive or validate echo returns may be tried. In other words, preferably the state machine 12 interrogates all 24 sensors sequentially, then repeats this interrogation in additional passes for a predetermined number of times, such as eight. Thus, the state machine 12 "loops" through all the sensors 14 a total of eight times and can store all the echo data for each sensor 14 in the RAM. (e.g., at 24 sensors and 8 samples per sensor there could be up to 192 echo data samples to store in the RAM). The count data is provided to the state machine 12 via the SAMPLE COUNT signal on bus 62, and the sample counter 46 is reset by the state machine 12 using the SAMPLE CLEAR signal via line 64.

A master clock signal provided on line 70 from a clock circuit 72 is used to activate and count the state machine 12 through its respective states and numerous functions. A series of shift registers and other timing devices internal to the state machine respond to the clock to sequentially control the various functions of the state machine. In the exemplary embodiment, the master clock signal 70 may be a 16 MHz oscillator which is divided down via counters or the like to a 500 kHz state clock to drive the state machine 12 through the described states at 2 microsecond intervals.

Operation of the fuel gauging apparatus of FIG. 1 is as follows. The clock circuit 72 applies clock pulses to the state machine 12 at power on. The state machine 12 automatically resets to an initial state (state $S_A$ in FIG. 2) and begins sequentially to interrogate each fuel level sensor 14. For each sensor 14 the state machine 12 issues an ultrasonic transmit pulse via the multiplexed transmit bus 16 to the active sensor 14 and uses the echo counter 40 to measure the time lapse for a valid echo to return. Transmit pulse energy can be set by a value stored in the register 32. When valid echos are returned via the multiplexed echo receive bus 18 (wherein a valid echo can be, for example, an echo detected within a valid time window determined by the measurement counter 42 and having a minimum energy level set by a threshold value stored in the register 32), the state machine 12 stores the corresponding data in the RAM 26 at a specific memory location for each sensor 14. After all the sensors 14 have been interrogated, the state machine 12 interrogates them all again and again until the sample counter 46 reaches the preset limit for the number of passes to be taken. The sensor counter 44 provides control to the state machine 12 to indicate which sensor 14 is the current sensor to interrogate. When all sensors have been interrogated the state machine 12 resets the sensor counter 44 via a reset control signal (not shown).

Thus, a hardware-only ultrasonic sensor data acquisition apparatus is provided that can interrogate a plurality of sensors without the use of a microprocessor or its attendant software.

Figure 2:
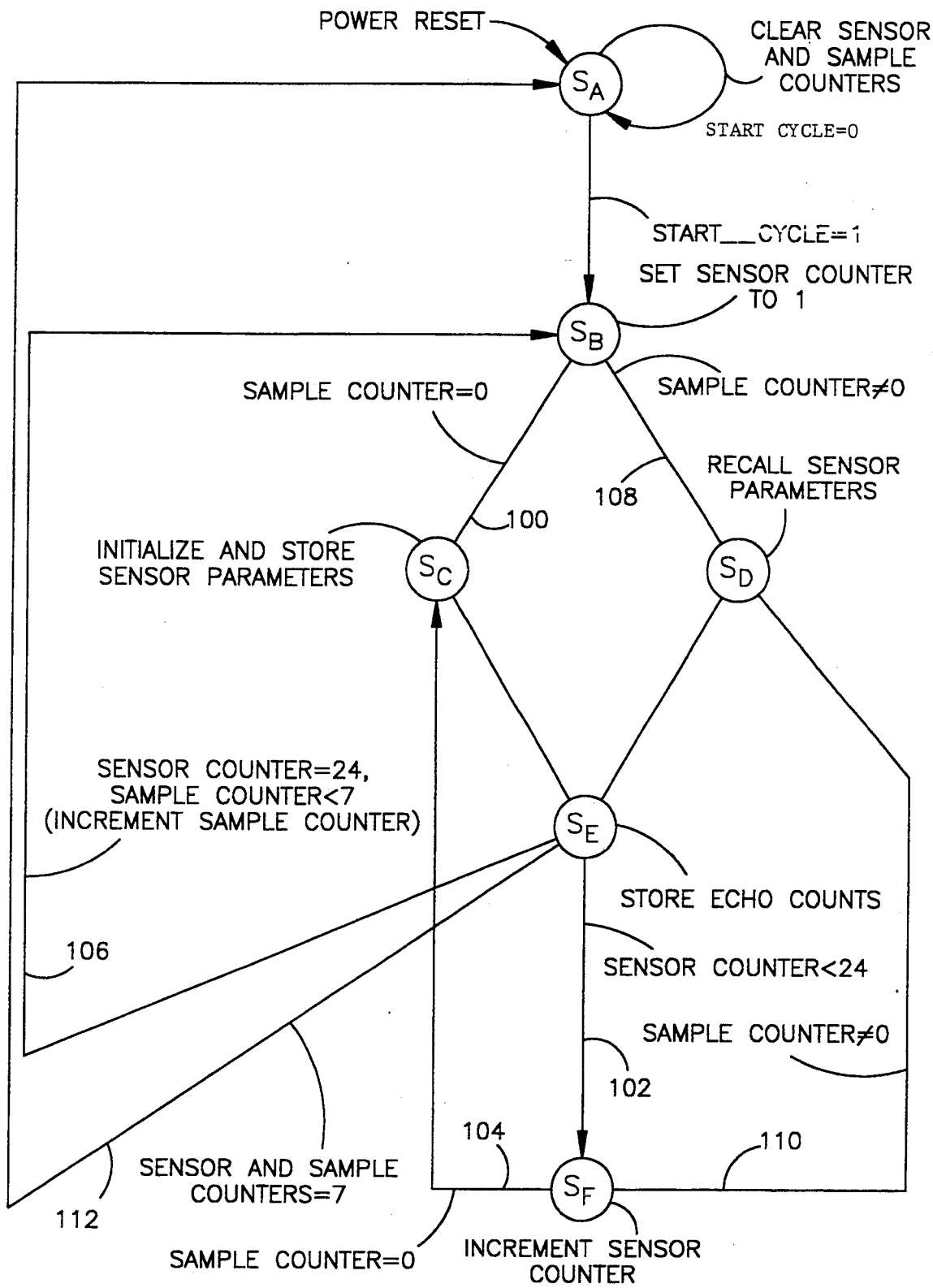
FIG. 2 is a preferred system state diagram for the apparatus of FIG. 1.

With reference next to FIG. 2, I show an exemplary system state diagram for the preferred embodiment of my invention as illustrated in FIG. 1. Upon power up of the fuel gauging apparatus, the state machine 12 is initially in state $S_A$. In state $S_A$, the state machine 12 automatically resets the sensor and sample counters 44,46. If a START CYCLE signal provided to the state machine 12 from an external source is low or "0", indicating that the fuel gauging apparatus is to remain in an idle mode, the state machine remains in state $S_A$. When the START CYCLE signal goes to 1, indicating that it is desired that the fuel gauging apparatus begin to cycle through the sensors 14, the state machine 14 proceeds to state $S_B$. In state $S_B$ the sensor counter 44 sets to 1, representing the first sensor 14 to be interrogated. This control action also sets the multiplexed address via lines 16 and 18 for the correct sensor 14 and the RAM address via address bus 28 for storing the echo data in the corresponding RAM memory location for the first sensor.

If the state machine 12 is at the first interrogation for the first sensor 14 (identified by the output of the sample counter 46 being equal to zero), then the state machine 12 transitions at 100 to state $S_C$ whereat it stores in the RAM 26 the sensor parameters accessed from the registers 32 (note that the registers 32 can store different control values for each sensor, with the state machine 12 accessing the appropriate data using the sensor parameter lines 72'). The state machine 12 then advances to state $S_E$ and the first current sensor 14 is interrogated and the echo data is stored in the RAM 26. In state $S_E$, if the sensor count from the sensor counter 44 is less than twenty-four, indicating that not all sensors 14 have been interrogated yet in the present cycle, the state machine 12 transitions at 102 to state $S_F$ where the sensor counter 44 is incremented by one and the state machine 12 returns to state $S_c$. It is noted that during the first interrogation cycle when the sample counter 46 output is still zero, the state machine 12 transitions from state $S_F$ directly to state $S_C$ via branch 104 because until the first interrogation sequence is completed for all the sensors 14, the state machine 14 must initialize the sensor parameters into the RAM. The above-described interrogation sequence then continues for each sensor 14 until all twenty-four sensors have been interrogated. (Note that during the first pass thru each of the sensors the sensor parameters are initialized for each sensor at state $S_C$).

In state $S_E$, the state machine 12 checks the output of the sensor counter 44, and when the output of the sensor counter 44 equals the total number of sensors (in this exemplary description it being twenty-four sensors); then, if the sample counter 46 output is still less than eight, the system branches at 106 back to state $S_B$, increments the sample counter, and interrogates all the sensors again. Note however, that after the first interrogation pass (during which sample counter $\neq 0$), the state machine 12 advances at transition path 108 from state $S_B$ to state $S_D$ because the sensor parameters have already been accessed initially, stored, and do not need to be initialized again. All the sensors 14 are thus interrogated again and again until the sample counter output reaches the preset limit (in this example seven) for the number of samples per sensor to be acquired. Note further that in state $S_F$, if the sample counter $\neq 0$, the system branches via transition path 110 directly to state $S_D$ and recalls from the RAM 26 the appropriate sensor parameter data for the current sensor 14 being interrogated.

In state $S_E$, when the output of the sample counter 46 equals the total number of samples per sensor and when the sensor counter 44 has reached the total number of sensors (i.e., twenty-four) for the eighth time, the state machine transitions via path 112 from state $S_E$ back to state $S_A$ and again resets and starts the entire start cycle over again in the event the start cycle signal is active.

Figure 3:
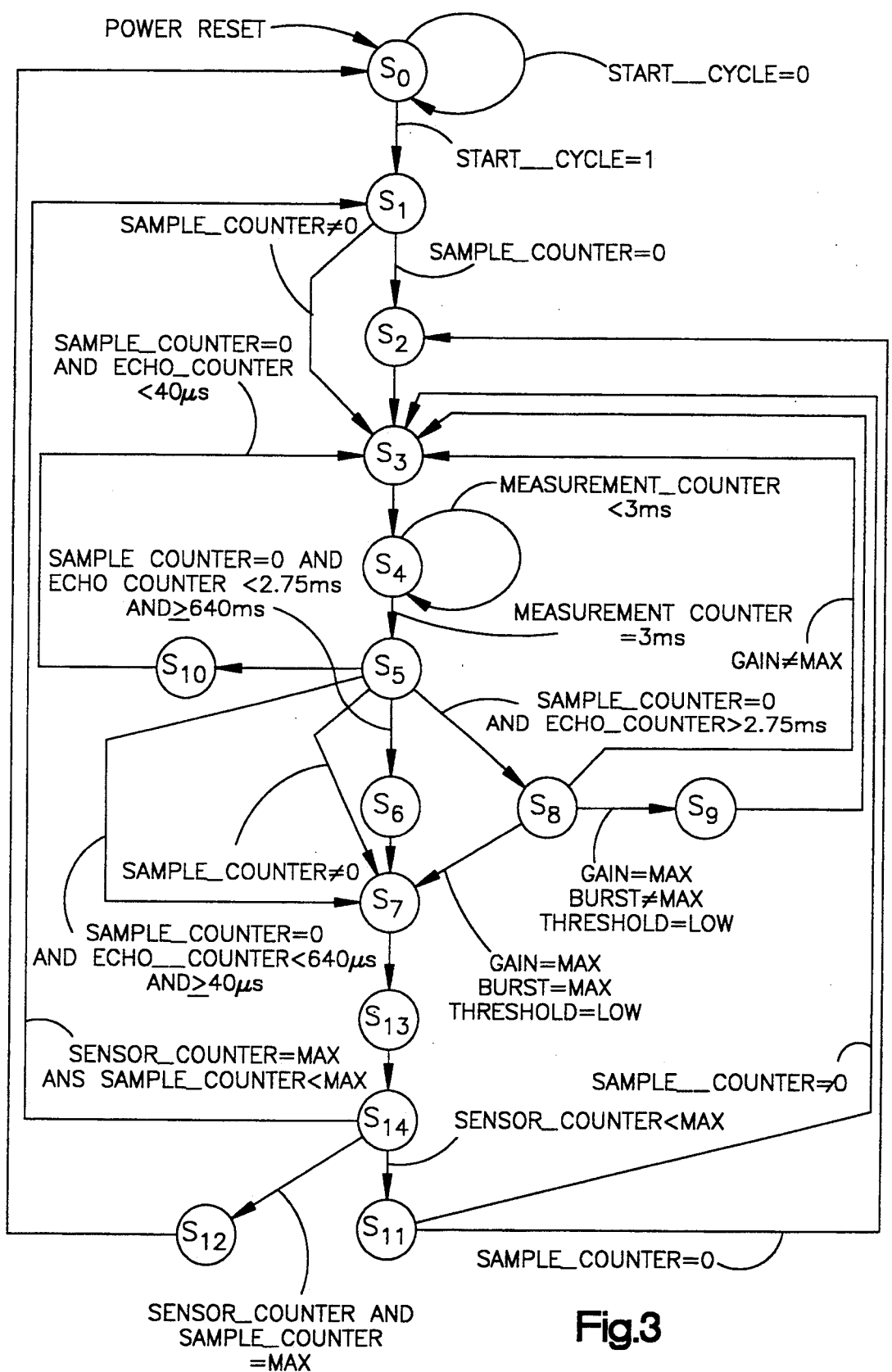
FIG. 3 is a more detailed preferred state diagram for the apparatus of FIG. 1.

The state diagram of FIG. 2 is now described in greater detail with reference to FIG. 3 and the accompanying Table I, which illustrate and describe in detail the various sequences between states $S_A$ through $S_F$ shown in FIG. 2. The states $S_A$ thru $S_F$ in FIG. 2 are represented in FIG. 3 by one or more individual states, i.e., substates, as will be appreciated. State $S_A$ of FIG. 2 is represented by state $S_0$ in FIG. 3 in which the state machine 12 is reset upon power up. In addition, the sample and sensor counters 46, 44 are cleared and the various outputs are initialized in state $S_o$ as represented in Table I. State $S_B$ of FIG. 2 is represented by state $S_1$ in FIG. 3 in which the sensor counter is set to 1. State $S_C$ of FIG. 2 is represented by states $S_1$, $S_2$, $S_3$, $S_4$, $S_5$, $S_6$, $S_8$, $S_9$ and $S_{10}$ in FIG. 3, the functions of which are to set default values for gain, burst and threshold of echo signals to be detected on lines 20, 22 and 24, respectively (State $S_2$); clear the measurement counter 42 to zero, and output values for gain, burst and threshold on lines 20, 22, and 24, respectively ($S_3$); initiate transmission of an ultrasonic pulse ($S_4$); set the burst value on line 22 to a maximum value ($S_6$); increment the gain value on line 20 ($S_8$), set the burst level on line 22 to a maximum value, and the threshold on line 24 to its low value ($S_9$), and set the burst level to a minimum value ($S_{10}$). State $S_D$ of FIG. 2 represents states $S_3$, $S_4$, $S_5$, $S_6$, $S_8$, $S_9$ and $S_{10}$ in FIG. 3. State $S_E$ of FIG. 2 includes states $S_7$, $S_{13}$, $S_{14}$ and $S_{12}$ of FIG. 3 during which the echo count data from each sensor is written to the RAM 26 until the maximum sensor count is reached. In state $S_7$ the state machine 12 effects a write of the echo counter 40 output data to the RAM, and increments the sample counter 46 if the sample counter output is less than the maximum (e.g., eight). State $S_{12}$ involves writing a stop bit to the RAM 26, and states $S_{13}$ and $S_{14}$ involve providing the appropriate write select and chip select instructions to the RAM 26 as part of the write operation effected in state $S_7$. State $S_F$ of FIG. 2 corresponds to state $S_{11}$ of FIG. 3 which increments the sensor count by 1 until the sample count equals zero.

In state $S_O$ the state machine 12 resets itself and waits for a start cycle signal indicating that the sensors are to be interrogated. In state $S_1$ the sensor counter 44 is reset to 1, thereby identifying the first sensor 14 to be interrogated. Initially when the sample counter 46 is equal to zero, the state machine 12 transitions from state $S_I$ to state $S_2$. In state $S_2$ the default values for gain, burst and threshold are set. The state machine 12 then proceeds to state $S_3$ where the measurement counter 42 is reset and the values for burst, gain and threshold are output for the sensor being interrogated.

In state $S_4$ the state machine 12 initiates the transmission of an ultrasonic pulse from the sensor being interrogated. The state machine continues in a closed self-loop in state $S_4$ after the ultrasonic pulse has been transmitted until the output of the measurement counter 42 is indicative of a fixed time period (e.g., 3 milliseconds (msec)) having elapsed, during which an echo must be received in order to be considered valid. When the measurement counter 42 output represents 3 msec (the respective counters described, herein being incremented at a known frequency), the state machine 12 transitions to state $S_5$.

In state $S_5$, the state machine 12 evaluates the integrity of the return echo. If the sample counter 46 output is zero, indicating the first pass through the sensors 14, the state machine 12 transitions to either state $S_7$, $S_6$, $S_8$ or $S_{10}$. Which particular state is transitioned to from state $S_5$ depends on the value of the echo counter 40 which represents the time elapsed between the transmission of the ultrasonic pulse in state $S_4$ and the time which an echo is received. If the value of the echo counter 40 represents too short a duration, e.g., an elapsed time in which a return echo could not reasonably be expected so soon, in the present example less than 40 microseconds, the state machine 12 transitions to state $S_{10}$ where the burst duration for the active sensor 14 is set to a minimum. The state machine 12 then returns to state $S_3$ and then state $S_4$ where the ultrasonic pulse is transmitted with a minimum burst duration.

If the value of the echo counter 40 represents an elapsed time between the transmission and receipt of the reflected pulse which is greater than or equal to 40 microseconds and less than a maximum time within which it is reasonably expected that the echo would be received, e.g., 640 microseconds, the received echo is considered to be valid. As a result, the state machine 12 transitions to state $S_7$ where the echo data received on line 18 is written to the RAM 26.

If in state $S_5$ the sample counter 46 is zero and the echo counter represents a time which is greater than or equal to 640 microseconds and less than a prescribed time within the 3 millisecond time period imposed in state $S_4$, e.g., 2.75 milliseconds, the state machine 12 transitions to state $S_6$. In state $S_6$, the burst duration of the ultrasonic pulse for the current sensor 14 being interrogated is set to a predetermined maximum value. The state machine 12 then transitions to state $S_7$ where the received echo count data is written to the RAM 26. If in state $S_5$ the echo counter 40 is greater than 2.75 milliseconds, it is assumed that a valid echo has not been detected and the state machine 12 transitions to state $S_8$. In state $S_8$ the gain of the present sensor 14 is incremented via line 20 so as to increase the sensitivity of the sensor 14. If the gain of the sensor 14 is not at a predetermined maximum after being incremented, the state machine 12 transitions to states $S_3$ and $S_4$ and the above-described steps are repeated. If in state $S_8$ the gain of the sensor 14 is incremented to the predetermined maximum, the burst level is not at a predetermined maximum, and the threshold level of the sensor 14 is not at a predetermined minimum (or low) as set in state $S_9$, for example, the state machine 12 proceeds to state $S_9$. In state $S_9$, the burst duration for the particular sensor 14 is set to the predetermined maximum and the threshold to a predetermined low. The state machine 12 then transitions back to states $S_3$ and $S_4$ where the process is repeated. If in state $S_8$ the corresponding gain and burst values of the sensor 14 are already at a maximum and the corresponding threshold level is at the predetermined minimum, the echo data is considered to be as best as can be expected. The state machine 12 transitions to state $S_7$ where the echo count data is written to the RAM 26.

In state $S_7$, the state machine 12 determines whether the output of the sensor counter 44 is at a maximum (e.g., 24) indicating that all sensors 14 have been interrogated in the present pass. Also, the state machine 12 checks whether the sample count is less than the predetermined maximum (e.g., 8) representing that the desired number of passes have been completed. If both conditions are satisfied, the state machine 12 increments the sample counter 46.and proceeds to state $S_{13}$. Otherwise, the sample counter 46 is not incremented and the state machine 12 simply proceeds to state $S_{13}$. It will be noted that after an initial pass through each of the sensors 14 the output of the sample counter 46 will no longer be equal to zero. Thus, the state machine 12 will transition from state $S_5$ directly to state $S_7$ at which point the respective values of burst, gain and threshold for the corresponding sensors 14 as established in the initial pass (as described above) and which were stored in the registers 32 are used. Also, when the output of the sample counter 46 is no longer equal to zero, the state machine will transition directly from state $S_1$ to state $S_3$ as shown in FIG. 3. This eliminates the step in state $S_2$ where the state machine 12 sets the values for gain, burst and threshold to the default levels as is done in the initial pass.

Referring again to states $S_{13}$ and $S_{14}$, in these states the various operations completing the write operation of state $S_7$ are performed, e.g., sending the appropriate write select and chip select signals to the RAM 26. In state $S_{14}$, if the sensor counter 44 is less than the maximum, the state machine 12 transitions to state $S_{11}$ where the sensor counter 44 is incremented to identify the next sensor 14 to be interrogated. If in state $S_{11}$ the value of the sample counter 46 is equal to zero indicating the initial pass, the state machine 12 transitions to state $S_2$ where the default values are set for the next sensor 14.

If in state $S_{11}$ the sample counter 46 output is not equal to zero indicating that the initial pass through all the sensors 14 has been completed, the state machine 12 transitions to state $S_3$.

If in state $S_{14}$ the sensor counter 44 output is equal to the maximum indicating the completion of a pass, but the sample counter 46 is less than the maximum indicating that these are more passes in the cycle, the state machine 12 transitions to state $S_1$ where the sensor counter is set to one and another pass begins. If in state $S_{14}$ the outputs of the sensor counter 44 and sample counter 46 are at the maximum, indicating the completion of a complete cycle, the state machine 12 transitions to state $S_{12}$. In state $S_{12}$, a stop bit is written to the RAM 26 to facilitate analysis of the echo count data stored in the RAM 26 using known techniques. From state $S_{12}$ the state machine 12 transitions to state $S_0$ whereat the above-process can be repeated for the next cycle when desired.

The state machine 12, as will be appreciated, can be made up of a large number of combinational (AND, OR, etc.) logic and sequential logic circuits (e.g. flip-flops) all within a configurable logic array such as the MAX EPLD (Erasable Programmable Logic Device) family manufactured by ALTERA.

The invention, therefore, provides a low cost design and hardware-only based apparatus for interrogating a plurality of ultrasonic sensors without microprocessors and software. Of course, the invention should not be construed in a limiting sense by the particular features of the described embodiment. For example, the invention can be used with any number of sensors and the number of interrogation cycles is largely a matter of design choice. Also, the invention is not intended to be limited to a state machine having a state diagram identical to those shown in FIGS. 2 and 3; rather, the state machine 12 can have any desired state design.

While the invention has been shown and described with respect to specific embodiments thereof, this is for the purpose of illustration rather than limitation, and other variations and modification of the specific embodiments herein shown and described will be apparent to those skilled in the art within the intended spirit and scope of the invention as set forth in the appended claims.

We claim:

1. An ultrasonic fuel gauging apparatus for a fuel tank, the apparatus comprising a plurality of ultrasonic fuel level sensors for sensing fuel levels at respective predetermined locations in a tank based on echo ranging; each sensor operating in response to one or more respective sensor control parameters; memory means for storing said sensor control parameters and sensor data; and a non-microprocessor controlled state device, interfaced with said sensors and said memory means, for interrogating each of said sensors by controlling the application of transmit pulses to each of said sensors and for receiving output signals corresponding to return echoes of said sensors; said state device controlling operation of said sensors in response to said sensor control parameters accessed by said state device from said memory means.

2. An apparatus according to claim 1 wherein said state device is a hardware configurable circuit device that sequentially functions from a logic counter, said state device operating on the basis of a state transition sequence executed by internal logic independent of control software.

3. An apparatus according to claim 2 wherein said memory means comprises random access memory means addressable by said state device for storing and retrieving echo data for each of said sensors; and a non-volatile memory for storing default sensor control parameters.

4. An apparatus according to claim 1 wherein said state device operates in response to a sequential state counter and adaptively modifies said sensor control parameters during a state transition sequence operation.

5. An apparatus according to claim 4 wherein said state device adaptively modifies said sensor parameters in response to said sensor output signals.

6. The system of claim 1 wherein said state device operates as a function of a logic state counter and is configured to read/write data autonomously to and from said memory means.

7. The system of claim 6 wherein said state device interrogates said sensors in a sequential pattern based on said control parameters stored in non-volatile data register means.

8. The system of claim 7 wherein said state device is a user configurable hardware circuit device having a plurality of integrated logic circuits.

9. The system of claim 8 wherein said state device operates independently of control software and firmware.

10. The system of claim 9 wherein said state device circuit functions are controlled by said logic state counter.

* * * * *